United States Patent [19]

Propst et al.

[11] 4,043,626

[45] Aug. 23, 1977

[54] POWER SUPPLY FOR MOVABLE OFFICE UNIT

[75] Inventors: Robert L. Propst, Ann Arbor; James O. Kelley, Spring Lake; Terry L. Mitchell, Jenison, all of Mich.

[73] Assignee: Herman Miller, Inc., Zeeland, Mich.

[21] Appl. No.: 699,253

[22] Filed: June 24, 1976

[51] Int. Cl.[2] .......................... E04F 19/04; H02G 3/28

[52] U.S. Cl. .......................... 339/23; 52/220; 52/242; 174/101

[58] Field of Search .......................... 339/20-24; 174/101, 66; 52/220, 221, 239-242

[56] References Cited

U.S. PATENT DOCUMENTS

| | | | |
|---|---|---|---|
| 2,175,144 | 10/1939 | Davison | 339/23 |
| 3,377,756 | 4/1968 | Polhamus | 174/101 |
| 3,423,892 | 1/1969 | Rimington | 52/241 |
| 3,766,692 | 10/1973 | Stark et al. | 52/239 |

*Primary Examiner*—Roy Lake
*Assistant Examiner*—Neil Abrams
*Attorney, Agent, or Firm*—Olsen and Stephenson

[57] ABSTRACT

A power track system for conveying and distributing electrical energy in a movable office unit having free standing walls. The system includes a plurality of track sections, each of which has a passageway in which an electrical cable is disposed. Connectors, joined to the cable, are secured at each end of the track section so that similar track sections can be connected together. The track sections are positioned on the floor under the free standing walls which secure the track sections in their positions. Outlets are provided at predetermined points along the track sections to enable connection of electrically operated devices to the cable.

5 Claims, 6 Drawing Figures

POWER SUPPLY FOR MOVABLE OFFICE UNIT

BACKGROUND OF THE INVENTION

The present invention relates generally to movable office units and, more specifically, to apparatus for conveying and distributing electrical energy to such office units.

Movable office units, or modular offices as they are also called, provide an effective alternative to permanent office constructions. Movable office units offer such advantages as providing flexibility in arranging the office units relative to each other and in the actual size and configuration of the individual unit. Thus, most efficient utilization of available floor space can be obtained. In addition, changing circumstances and conditions can easily be met by appropriate rearranging of the movable office units.

Lighting fixtures and other electrically operated devices normally used in office environments require electricity to operate. Since the outlets available are either along the permanent walls of the building in which the office units are arranged, in the floor, or on power poles coming from the ceiling, provision must still be made to deliver electricity to the office units and then distribute the electricity within the units. Since portability is one of the main characteristics of these movable office units, there is a need to convey and distribute electricity in each office unit in an efficient manner using a power delivery system that is as portable and flexible as the movable office units and yet which can be securely maintained when positioned for operation.

In a co-pending application entitled "Electrically Wired Floor Construction", Ser. No. 613,083, filed Sept. 15, 1975 now U.S. Pat. No. 3,984,621, applicant discloses a solution to the problem of delivering electrical energy to the movable office unit. An electrically wired floor construction is provided in which a subcovering is placed on the floor and the free standing walls of the movable office unit are supported on a floor covering which is on top of the subcovering. Electrical cables are positioned in grooves formed in the subcovering so as not to disrupt the smooth surface of the floor covering. The cable is connected to a remote power source at one end and at the other end it extends through the floor covering where the movable office unit is located.

The present invention provides a system for conveying and distributing the electricity within the movable office unit after the electricity has been delivered to the office unit and includes a power track system which is portable and adaptable to conform to various movable office arrangements. The power track system of the present invention is easy to assemble and disassemble and integrates into conventional movable office units to remain relatively unnoticeable.

SUMMARY OF THE INVENTION

The present invention provides a power track system for conveying and distributing electrical energy within a movable office unit after the electrical energy has been delivered to the office. The power track system consists of a plurality of interconnected track sections positioned on the floor or other supporting surface under the free standing walls of the movable office unit. Each track section has a passageway which extends between its end walls in which an electrical cable or other suitable electrical transmission means is positioned. Connectors are secured at each end of the track section and are joined to the cable. Adjoining track sections are connected by engaging the corresponding connectors of the respective track sections. Access means are provided in selected connectors and an outlet plug is engaged therein providing a standard outlet for electrically operated devices. The track sections are formed having a recessed wall engaging portion formed on the top wall in which the free standing walls of the modular office unit are disposed. Thus, the track sections are securely maintained on the supporting surface under the walls of the office unit. Accordingly, the track sections can be easily concealed while providing outlets along the perimeter of the office unit. Side covers for the track section are provided which perform a double function. First, they provide easy access to the space below the lower ends of the office walls and the upper sides of the track sections, thereby enabling use of this space to house communications wiring for the office unit. Second, they provide a visual link between the track sections and the walls so that they appear to be one unit.

It is thus an object of the present invention to provide a portable power supply system for conveying and distributing electricity in movable office units.

Further objects, features and advantages of the present invention will become apparent from a consideration of the following description when taken in connection with the appended claims and the accompanying drawing in which:

Figure 2:
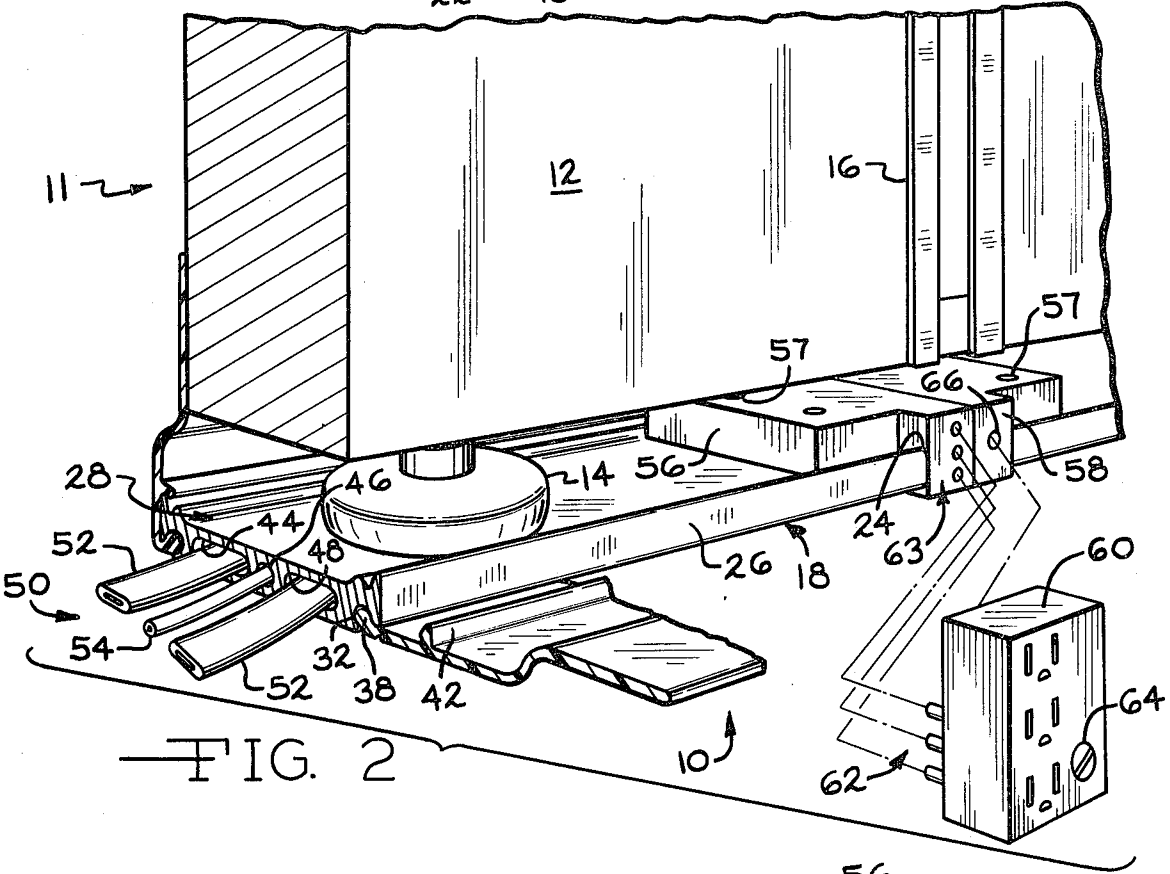
FIG. 2 is a perspective view showing a pair of interconnected movable office walls positioned on the power track system of the present invention.
Figures 4, 5, 6:
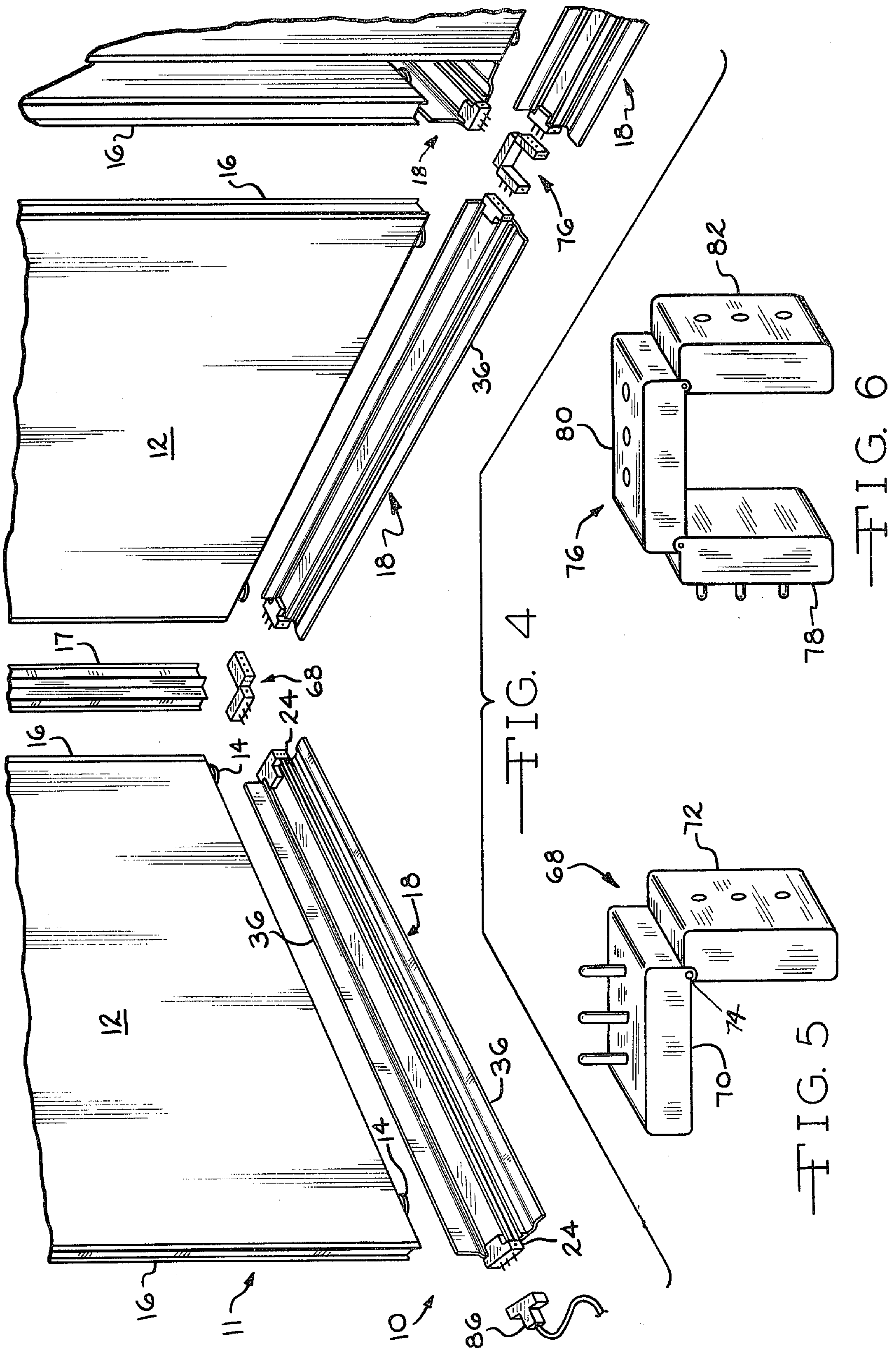
FIG. 4 is an exploded perspective view of a portion of a movable office unit incorporating the power track system of the present invention.
FIGS. 5 and 6 show in greater detail the intermediate connector elements of the present invention shown in FIG. 4.

Referring to the drawing, the power track system 10 of the present invention is shown in FIGS. 2 and 4 incorporated into a movable office unit 11. The movable office unit 11 includes walls 12 and support legs 14. The walls 12 are arranged in a suitable manner to form the desired size and shape of the office unit 11 and are joined in a suitable manner such as by the joint 16 or by the corner post 17 shown in FIG. 4, which enables the walls 12 to be positioned at an angle relative to each other.

The power track system 10 consists of a plurality of track sections 18 which are interconnected to form an electrical energy conveying and distributing system. The power track system 10 is positioned on the floor 13 or other suitable supporting surface such as disclosed in the above-identified application. The walls 12 are placed on the track system 10 to securely maintain it in its position. Each track section 18 comprises a top surface or wall 20, a bottom surface or wall 22, end walls 24 and side walls 26 which extend above the top wall 20. Retaining ribs 30 are integrally formed with the top wall 20 to provide a wall engaging portion 28 to prevent cross wise movement of the legs 14.

Elongated slots 32 are formed in the corners of the track sections 18 between the side walls 24 and bottom wall 22. Each slot 32 functions to receive a side cover 36 which can be swung to a position to conceal the gap between the wall 12 and the track section 18. With the side covers 36 in their upright positions it appears as if the walls 12 of the office unit 11 consist of a single construction. Each side cover 36 consists of a shaped body member 37 having a bead portion 38 that is disposed within the slot 32. A notch 40 is formed along the entire length of each cover 36 adjacent the bead 38 and provides a pivot or hinge point about which the side cover 36 is swung. A latch member 42 is integrally formed with the member 37 and engages the side wall 26 to secure the side cover 36 in the upright position shown in FIG. 1.

Passageways 44, 46 and 48 (FIG. 2) are formed in each track section 18, and electrical transmission means are disposed therein. Upright struts 49 between passageway 46 and passageways 44 and 48 provide additional support for the top wall 20 for supporting the free standing walls 12. An electrical cable unit 50 is provided and includes the conductors 52 and the ground 54 which are positioned in the reapective passageways 44, 46 and 48 to extend between the end walls 24.

Figure 3:
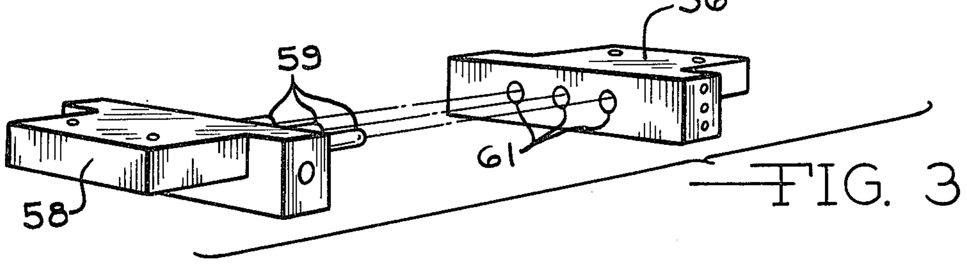
FIG. 3 is a perspective view showing the electrical connectors of the present invention.

Connector means including a female connector element 56 secured by screws 57 at one end wall 24 and a male connector element secured by screws 57 to the other end wall 24 of the track section 18 are joined in a suitable manner to the cable 50. One track section 18 may be connected to an adjoining track section 18 by connecting the female connector 56 of the first track section 18 and the male connector 58 of the second track section 18. The male connector element 58 (FIG. 3) has three prongs 59 corresponding outlet openings 61 in the female connector 56. Contacts (not shown) are located in the openings 61 and are suitably connected to the cable 50. In the present embodiment, the female connectors 56 have access means comprising the openings 63 having contacts for connection to the cable unit 50. An outlet plug 60 having prongs 62 corresponding to the access openings 63 of the female connector 56 provides an outlet for electrically operated devices. The outlet plug 60 is provided with a fastening screw 64 that threadedly engages into similarly threaded opening 66 in the male connector 58. The outlet plug 10 thus also aids in maintaining the connection between the connectors 56 and 58.

Intermediate connector elements are further provided for connecting track sections 18 in positions in which they are angularly located relative to each other. Intermediate connector element 68 (FIG. 5) consists of two sections positioned at right angles relative to each other. Male connector section 70 is electrically connected in a suitable manner to a female connector section 72 and the sections 70 and 72 are joined together by a hinge pin 74 which enables the sections 70 and 72 to be arranged at a desired angle relative to each other. As seen in FIG. 4, the intermediate connector 68 connects the track sections 18 which are positioned at right angles to each other under their respective supporting walls 12 to form a corner of an office unit 11.

A modified intermediate connector element 76 is shown in FIG. 6 comprising a male connector section 78 and female connector sections 80 and 82 all connected to common electrical conductors (not shown). The sections 78, 80 and 82 are joined by the pins 84 and adjacent sections are angularly positioned. The connector 76 is incorporated into the office unit 11 in FIG. 4 and in addition to connecting a pair of in-line track sections 18, a third track section 18, positioned perpendicular to the other track sections 18 can be electrically connected. In this manner, a series of office units 11 can be electrically connected from a single outside power source. Although two forms of the intermediate connector elements have been shown, it is within the purview of this invention that intermediate connector elements can be formed of more than two or three sections positioned at angles other than right angles relative to adjoining sections. The needs of the user would dictate the exact configuration of the intermediate connector section.

An external source of electrical energy can be connected to a first track section 18, for instance, by the plug 86 and when the track sections 18 shown in FIG. 4 are connected, electrical energy is conveyed and distributed through the power track system 10 along the base of the walls 12. At the connection points between adjoining track sections 18, outlet plugs 60 can be plugged into the female connectors 56 to enable the connection of electrically operated devices. The track sections 18, because they are positioned under the walls 12, remain in a secure, convenient location. Also, with the side covers 36 in upright position, the track sections 18 remain relatively unnoticeable.

Figure 1:
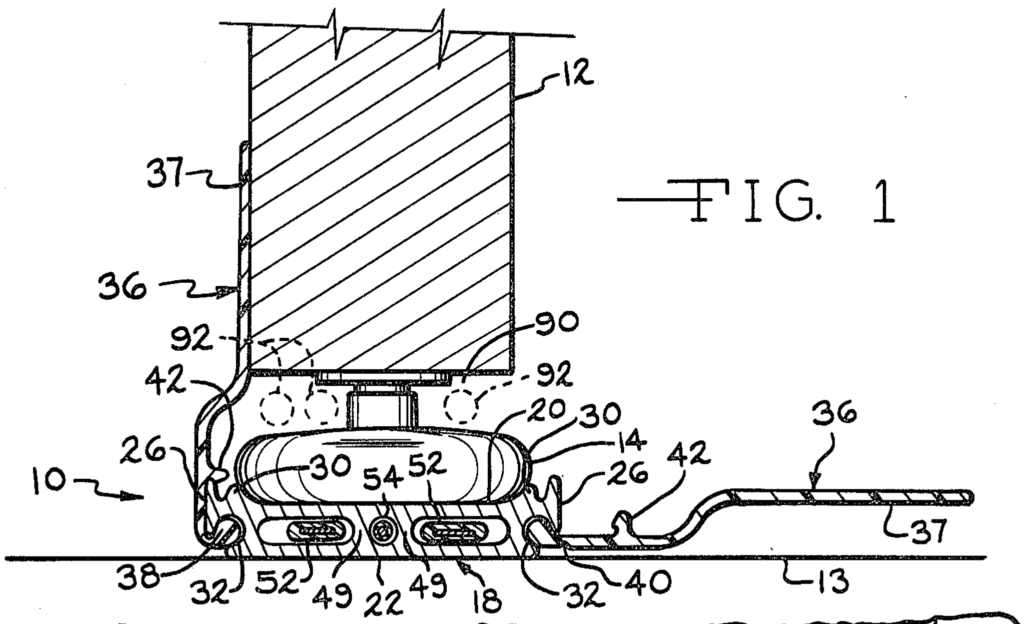
FIG. 1 is a fragmentary sectional view of a movable office wall positioned on the power track of the present invention.

The side panels 36, in their upright positions, and the track sections 18 cooperate with the walls 12 to form enclosed spaces 90 (FIG. 1) in which communications wiring, indicated diagrammatically at 92, can be housed. The wiring 92 is separated from the power cables 52 and 54 by the metal track sections 18 and is used for operating telephones, C R T terminals, and the like. The legs 14 are vertically adjustable on the walls 12 and are thus adjustable to vary the size of the space 90 to meet size requirements. The wiring 92 is readily accessible by folding one or more covers 36 down as shown in FIG. 1.

What is claimed is:

1. Electrical energy distributing apparatus comprising a longitudinally extending track having top and bottom surfaces and adapted for positioning on a supporting surface, a wall member having a lower end and depending leg members connected to and supporting said wall member on said track in a position in which said wall lower end is spaced above said track top surface to form a space, a cover member extending longitudinally of said track for covering said space between said wall lower end and said track top surface, means mounting said cover member on said track for movement between an upright closed position blocking access to said space and an angularly displaced position with respect to said upright position enabling access to said space, and coacting latch means on said cover member and said track operable to releasably maintain said cover member in said closed position.

2. Apparatus according to claim 1 further including spaced apart upright sidewalls mounted on and extending longitudinally of said track, and wherein said latch means comprises a projecting latch member integrally formed with said cover member and engageable with one of said side walls in the closed position.

3. Apparatus according to claim 2 wherein said leg members are positioned on said track at positions between said sidewalls.

4. Apparatus according to claim 1 further including a pair of connector elements, one connector element being mounted at one end of said track and the other connector element being mounted at the other end of said track, an outlet plug mounted on one of said connector elements in a position extending transversely of said track, and electrical transmission means located below said wall member and being connected to said connector elements.

5. Apparatus according to claim 4 further including an intermediate connector element adapted to be connected to a plurality of said connector elements, said intermediate connector element comprising a plurality of electrically connected sections, each of said sections being adapted to be connected to a connector element, each of said connector sections being angularly related to the other connector sections enabling a plurality of tracks to extend in different directions from said intermediate connector element.

* * * * *